United States Patent [19]

Orlowski

[11] Patent Number: 4,706,968
[45] Date of Patent: Nov. 17, 1987

[54] SEALING RINGS WITH COMPLIMENTARY RING MEMBERS

[76] Inventor: David C. Orlowski, 3507 78th Ave., Drawer 940, Rock Island, Ill. 61201

[21] Appl. No.: 936,456

[22] Filed: Dec. 1, 1986

[51] Int. Cl.$^4$ .............................................. F16J 15/447
[52] U.S. Cl. .................................. 277/53; 277/167.5; 277/193; 277/199; 277/24
[58] Field of Search ..................... 277/53, 54, 192–195, 277/198, 199, 167.5, 81 R, 24

[56] References Cited

U.S. PATENT DOCUMENTS

| 1,483,499 | 2/1924 | Allee | 277/167.5 |
| 2,274,201 | 2/1942 | Horger | 277/53 |
| 2,413,308 | 12/1946 | Arnold | 277/167.5 X |

FOREIGN PATENT DOCUMENTS

| 945915 | 7/1956 | Fed. Rep. of Germany | 277/53 |
| 397362 | 2/1966 | Switzerland | 277/53 |

Primary Examiner—Robert S. Ward
Attorney, Agent, or Firm—Y. Judd Azulay

[57] ABSTRACT

A mechanical seal for rotating shafts having a first, second and third ring member. The first ring member has a series of annular axial grooves in the internal bore and a slot extending across the grooves to an end of the first ring. The second ring member is adapted for insertion into an annular recess in the first ring member. The first and second rings have complimentary adjacent recesses for insertion of a third ring member.

11 Claims, 3 Drawing Figures

SEALING RINGS WITH COMPLIMENTARY RING MEMBERS

BACKGROUND OF THE INVENTION

The present invention is deemed to be a considerable and meritorious improvement over the inventions disclosed in U.S. Pat. Nos. 4,022,479, 4,114,902 and 4,466,620.

In many industries, it is extremely important to obtain a seal for rotating shafts emerging from a bearing and its housing which prevents the lubricants associated with the bearings from leaking externally of the associated housing or bearing support and for preventing contaminants in the environment from working themselves through the seal and into the lubricant for the bearings.

U.S. Pat. No. 4,022,479 incorporates a disclosure wherein there is taught a sealing ring structure which has an object elimination of the loss of lubricant from the bearings supporting a rotating shaft. The sealing ring structure as disclosed also eliminates the movement of contaminants into the bearing area and lubricant within the housing. It was therein disclosed a sealing structure that is composed of two rings, preferably metal, one of which is fixed to the housing and the other is fixed to rotate with the shaft. The ring that is fixed to the housing has a labyrinth-type of seal next to the shaft which prevents lubricant from moving outside of the housing along the shaft.

In U.S. Pat. No. 4,022,479, a joint was provided between the two rings which is composed of an annular recess in the first ring axially outwardly of the housing and an annular flange on the second ring that fits within the aforementioned annular recess of the first ring. The construction of the annular recess and the annular flange are complimentary, so that when the two rings are rotating relative to one another, they will not tend to bind, or create a heated frictional disposition between them. There was also provided in the first sealing ring an elongated circular passage that communicates from the aforementioned annular recess. In the embodiment taught in this prior patent, the annular flange of the second sealing ring has axial notches cut therein. With such an arrangement, foreign particles that migrate into the joint formed by the recess and flange are propelled, and directed, back into the environment. It will be noted that the first ring is fixed to the housing and the second ring is adapted to rotate with the shaft by suitable frictional sealing means. However, there is no rubbing, wear or contact between the respective sealing rings.

The invention of U.S. Pat. No. 4,114,902 was an ingenious improvement over the device disclosed in U.S. Pat. No. 4,022,479. The improvement included the use of at least one groove on the periphery of the annular flange of the second ring member. Additionally, the outer axial wall of the accomodating recess in the first ring member also contained at least one groove. It was noted in U.S. Pat. No. 4,114,902 that these grooves act to inhibit particle migration, regardless of relative peripheral speed of the rotating rings and to provide a circumferential path for the gravitational exclusion of foreign material even in the event of zero relative rotation.

The invention of U.S. Pat. No. 4,466,620 is a further ingenious improvement over the devices disclosed in the aforementioned patents and solves additional problems. The improvement, among other items, includes a modification of the hole in the first sealing ring. The hole was modified such that its axially extending length is greater than its circumferentially extending width. This improvement eliminated expulsion problems which occasionally arose due to the relative axial displacement of the sealing rings and provided an effective vent to expell foreign matter from the annular recess, or recesses if more than one flange-recess combination were required.

U.S. Pat. No. 4,466,620 also encompassed an additional improvement wherein a portion of the first ring member that faces the bearing located inside the housing is axially extended to form a shielding protrusion. This improvement wards off the profuse quantities of liquid lubricant that are continuously directed at the first ring member in certain situations, e.g. multiple gear and pinion speed reduction gearing.

Although the above advances have solved a great number of problems, problems were still encountered in various particular work applications. Accordingly, it would be highly desirable to have a sealing ring structure that eliminates those problems.

SUMMARY OF THE INVENTION

The object of the invention is to provide a seal around rotating shafts and their housings to prevent leakage of lubricants and to prevent the entry of contaminants into the shaft housings by the ingenious use of an intermediate ring located in the labyrinth interface of a two-piece labyrinth mechanical sealing device.

Generally two-piece labyrinth mechanical seals depend for efficacy upon a tortuous path, through which the migration of lubricating fluid or contaminants is virtually impossible. Commonly, one part of the mechanical labyrinth seal is affixed to the shaft and one part of the seal is affixed to the housing over which a seal is sought to be obtained. The interface, or point of mesh, between the two parts of the mechanical seal is often designed to provide a labyrinth or tortuous path at that point of close proximity with the object of attaining a seal.

This invention is an ingenious improvement over the art of two piece mechanical seals by the introduction of a third ring member to provide a non-obvious sealing means at the labyrinth interface. This provides not only a more effective seal, not dependent upon rotary motion, but also a certain means to allow axial separation of the fixed ring and the rotating ring as a result of axial shaft displacement in an outward direction away from the bearing. Further, the application of a shoulder to the outer ring of the mechanical seal provides a sure, accurate method of preventing the outer ring from being pushed too far into the housing inadvertently, provides a means of accurately locating the seal with respect to the housing and it also provides a means of locating the alignment of the seal perpendicularly to the axis of the shaft.

The invention consists of a mechanical seal made in three parts.

The first, stationary to the housing ring is identified by a series of annular grooves in its bore, an o-ring or other means on its outer periphery allowing it to be fixed to the shaft housing and a shoulder on its outer periphery to provide a stop when the ring member is fitted into the shaft housing. The series of annular grooves in the bore of the first ring member, connected by a groove or trough across the bottom, sloping down to provide a drain trough is revealed in the prior art, together with the concept of an o-ring seal on the outer periphery of the ring member. The concept of providing a shoulder or ramp against which the first ring member may not be fitted further into the shaft housing while also allowing angular adjustment of the seal is not revealed in the prior art.

The fixed, first ring member also provides a labyrinth path at the interface, its point of close proximity with the second ring member, by an annular recess in the interface into which a complimentary annular flange on the second rotating ring member is made to fit. The annular flange and recess combination can be made to provide a more effective seal by the insertion of a port or vent on the bottom of the first ring member into that annular recess. Virtually all matter making its way into the flange-recess will be expelled by rotary motion. That concept is also taught in the prior art.

This invention is unique and ingenious for the concept of introducing a third ring member which floats at the interface of the first stationary ring member and the second rotary ring member in complimentary, adjacent, annular recesses in both the first ring member and the second ring member at that interface. With the addition of raised edges or annular grooves along the circumferential periphery of the third ring member made to be fitted to accomodating annular grooves or annular extrusions in the complimentary, adjacent, annular recesses, the third ring member also performs a locking function holding the first ring member to the second ring member. Further, judicious selection of materials in the manufacture of the third ring member allows a wide range of seals against very high or low viscosity fluids, very caustic or corrosive fluids, very highly penetrating oils, and flash or explosive conditions.

The size of the third ring member should be sufficient to allow a well defined annular recess in the first and second ring member with a width sufficient to provide a seal in light of the anticipated conditions required to effect a seal. The third ring member should be located between the shaft and any annular recess-flange combinations provided at the interface in the first and second ring members. A fourth and fifth ring member similar to the third ring member of a similar or different material can also be introduced in like manner at the interface of the first and second ring members when design conditions require or permit.

DESCRIPTION OF THE PREFERRED EMBODIMENT

Figure 1:
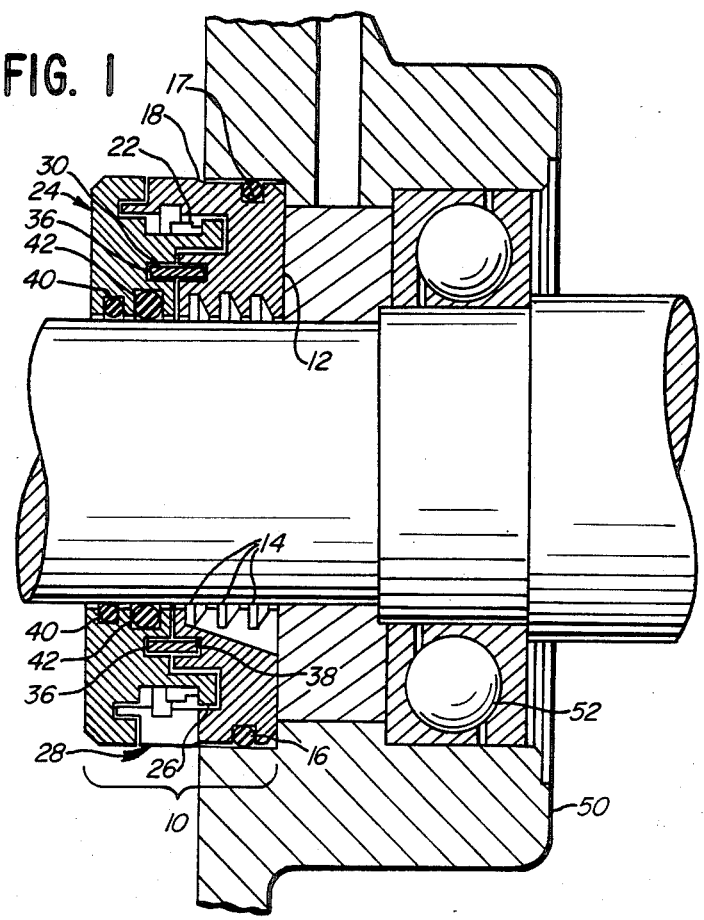
FIG. 1 is a vertical sectional view showing the improved sealing structure with a shaft.
Figure 2:
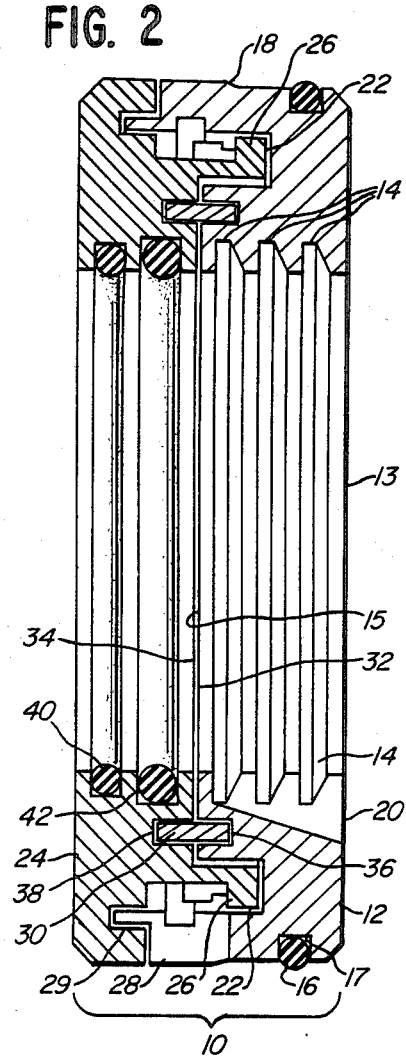
FIG. 2 is a vertical sectional view showing the improved sealing structure.
Figure 3:
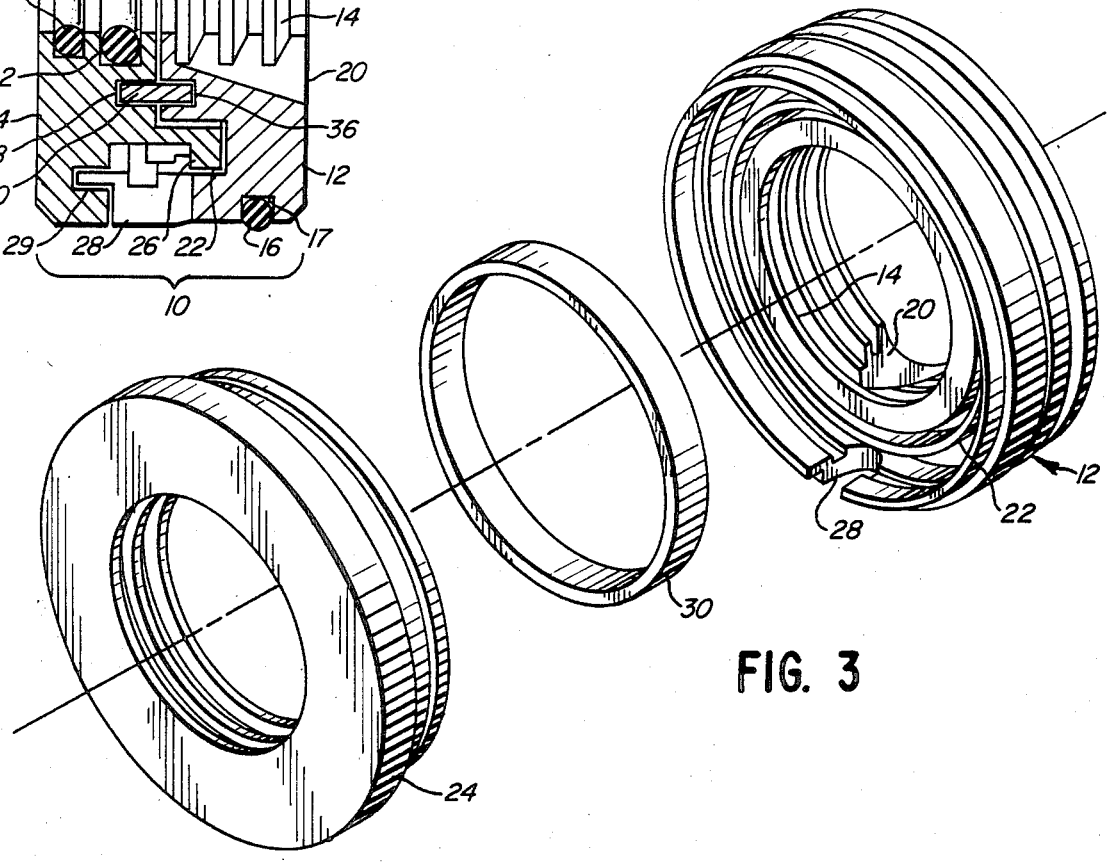
FIG. 3 is an exploded perspective view of the sealing ring of the present invention.

Referring first to FIG. 1, there is shown an arrangement in which the sealing structure of the present invention may be employed. There is shown the sealing rings of the present invention 10 in vertical crossection mounted on a shaft 100. The shaft extends through a bearing housing 50. Sleeve type bearing, journal bearing or rolling element with bearings shown schematically as 52, is conventionally fitted to the shaft 100. Conventional means are provided to provide lubricant to the race. More details of this feature can be discerned from the aforementioned U.S. Pat. No. 4,022,479, which is herein incorporated by reference.

In order to prevent leakage of the lubricant from inside the housing 50 outwardly and the leakage of foreign material from outside the housing into the bearings or lubricant, there is provided a sealing ring structure composed of a first ring 12 and a mating second ring 24. The first ring 12 has an external radially extending face or first end 13, facing internally to the fixed housing, an internal radially extending face or second end 15, facing externally to the fixed housing, an inner axially extending face, and an outer axially extending face. The first ring 12 also possesses an external annular groove 17 in which seats a conventional o-ring 16 that bears against the inner diameter of a complimentary circular opening in the housing 50. The first ring 12 may be secured with respect to the housing 50 by a wedge fit with respect thereto. Inwardly extending radial grooves 14 are provided on the inner surface of the first ring 12 and provide radial shoulders which engage lubricant tending to move axially outwardly along the shaft portion 100 and to guide it into an axially extending groove 20 on the inside of the first ring 12. The groove 20 joins the annular grooves 14 and leads back into the housing 50 to provide a drain trough. The second end 15 of the first ring (stator) 12 is provided with an annular recess 22 that extends axially from the second end 15 and serves as one part of the interface with the second ring (rotor) 24. The annular recess 22 has an inwardly radially facing wall and an outwardly radially facing wall.

The second ring 24 fits around the shaft portion 50 and possesses internal annular grooves that are fitted with conventional o-rings 40, 42. The frictional engagement of the o-rings 40, 42 between the second ring 24 and the shaft portion 50 causes the second ring 24 to rotate with the shaft 50. The o-rings also limit axial movement of the second ring 24 on the shaft portion 50. Further, the second ring is provided with an annular flange 26 that is complimentary to and fits within the aforementioned axial recess 22 of the first ring 12. The flange 26 extends axially from the inner and outer radial faces that are positioned alongside the inner and outer faces of the recess at the second end 15 of the first ring 12.

A hole is provided externally of the first ring 12 which extends to the recesses 22 and 29. Preferably, the hole has an axially extending length greater than its circumferentially extending width. This preferred embodiment eliminates expulsion problems which occasionally arise due to relative axial displacement of the two sealing rings, 12 and 24, and facilitates the expulsion of matter from the recesses 22 and 29 as a vent or port.

It should also be known that the radial dimension of the flange 26 is from 0.005 inches to 0.015 inches smaller than the radial dimension of the recess 22. Consequently, the second ring 24 is permitted to rotate within the recess with practially zero friction between the respective surfaces.

The first ring 12 also includes shoulder means 18 on its outer most axially extending face. The shoulder means or incline 18 limits the depth to which said first ring member may be inserted into housing 50.

The incline 18, depending on the housing, may be 5 degrees to 20 degrees from the axis of the first ring member. Optimally, the incline 18 is 15 degrees. Further, the incline 18 permits the seal 10 to orient to the axis of the shaft, rather than conforming to the orientation of the housing.

The incline 18 is made steep enough to limit the axial positioning inward to the housing and shallow enough so angular orientation of the entire seal is kept to the axis of the shaft.

The first ring 12 and second ring member 24 each have complimentary adjecent annular recesses 36, 38. In the first ring 12, the complimentary adjecent annular recess 36 is located at the second end 15 facing externally of the housing.

Within the complimentary adjacent annular recesses 36, 38 is placed a third ring member 30. The third ring member 30 may be made of plastic, wood, fiber or any other non-metallic material. Alternatively, the third ring member 30 may be made of any metallic material. The third ring member 30, may include an raised edge or annular groove along its circumference of both ends. These raised edges or annular grooves would be accomodated by annular grooves or annular protrusions in the wall of both complimentary recesses 36, 38. With this raised edge and groove combination a locking fit of the first ring member 12 to the second ring member 24 is obtained. However, the axial displacement remains accomodated by the continuity of the third ring member 30.

The introduction of the third ring 30 also provides a sealing means at the first and second ring interfaces 32, 34. This provides an effective seal not dependent upon rotary motion in any degree. It further provides a means of accomodating any consequences of separation of the first ring 12 and second ring 24 caused by axial displacement of the shaft. Also, it has been observed that differential pressures across the seal in various instances, i.e. lubricant submerged shafts and pump stuffing boxes, are accomodated. Thus, leakage accross the seal is greatly diminished, if not virtually eliminated.

As was mentioned in the issued patents, that while o-rings are provided for seals, there is little or no relative rotation between the sealing surfaces and the o-rings. Therefore, the o-rings should not wear and the possibility of breaking the seal is remote.

Based on this disclosure, many other modifications and ramifications will naturally suggest themselves to those skilled in the art. These are intended to be comprehended within the scope of this invention.

I claim:

1. A ring seal between a fixed housing and a rotating shaft comprising:
   a. a first ring member having a first end facing internally to the fixed housing and a second end facing externally of the said housing and an outer surface being fixed and sealed to said housing by a shoulder means,
   b. said first ring member having a series of annular grooves in the internal bore of said first ring member with said annular grooves disposed adjacent to the shaft with a slot extending across said grooves to the first end of said first ring member as a drain trough,
   c. a second ring member fixed to rotate with said shaft and having an annular flange extending axially with inner and outer radial surfaces, adapted for insertion in an accomodating annular recess in said first ring member at the interface between said first ring member and said second ring member,
   d. said second ring member also having an annular recess adjacent to and complimentary with an annular recess in the face of said second end of said first ring member at the interface of said first and second ring members, and
   e. a third ring member within said complimentary, adjacent recesses in said first ring member and said second ring member.

2. The seal of claim 1 having a shoulder means on a portion of said first ring member in contact with said fixed housing whereby said shoulder means limits the depth to which said first ring member may be inserted into the fixed housing by a circumferential incline.

3. The seal of claim 1 wherein an opening is located at the bottom of said first ring member providing a port from the first recess-flange combination at the seal interface to expell contaminants.

4. The seal of claim 2 wherein said shoulder means is an incline of from 5 to 20 degrees from the horizontal.

5. The seal of claim 1 wherein said first ring member has an annular flange extending axially from inner and outer radial surfaces adapted for insertion in an accomodating annular recess in said second ring member.

6. The seal of claim 1 wherein an opening is provided at the bottom of said first ring member extending through and into said first annular flange of said first ring member and also through and into said first annular recess in said second end of said first ring member.

7. The seal of claim 1 wherein said third ring member is comprised of fiber, plastic, wood or some suitable non-metallic material.

8. The seal of claim 1 wherein said third ring member is comprised of some suitable metallic material.

9. The seal of claim 1 wherein said third ring member has means along its circumference to fit into accomodating means inside the complimentary adjacent annular recesses in said first ring member and said second ring member to lock said first and second ring members together.

10. The seal of claim 9 wherein said means along the circumference of said third ring member consists of an extrusion, or raised edge fitting into accomodating annular grooves in said adjacent, complimentary recesses in said first ring member and said second ring member to lock said first and second ring members together.

11. The seal of claim 9 wherein said means along the circumference of said third ring member consists of one or more grooves fitting into accomodating annular extrusions in said adjacent complimentary recesses in said first ring member and said second ring member to lock said first and second ring members together.

* * * * *